United States Patent
McNabney

[15] 3,687,364
[45] Aug. 29, 1972

[54] AIR DISTRIBUTION SYSTEM WITH FLOW LIMITING DEVICE

[72] Inventor: John C. McNabney, La Crosse, Wis. 54601

[73] Assignee: The Trane Company, La Crosse, Wis.

[22] Filed: Nov. 4, 1970

[21] Appl. No.: 86,661

[52] U.S. Cl. .....................236/49, 137/498, 236/78
[51] Int. Cl. ................................................F24f 7/06
[58] Field of Search ..............236/49, 13, 78 C, 78 A; 137/498

[56] References Cited

UNITED STATES PATENTS 3,420,439   1/1969   Meckler...................236/49 X
3,037,702   6/1962   Mauer et al. ................236/13
2,386,569   10/1945   Parsons....................236/78 C Primary Examiner—William E. Wayner
Attorney—Robert E. Lowe, Arthur O. Andersen and Carl M. Lewis

[57] ABSTRACT

An apparatus and method for limiting the flow in a variable air volume distribution system in which a sensed differential pressure provides a signal to increase or decrease air flow.

12 Claims, 3 Drawing Figures

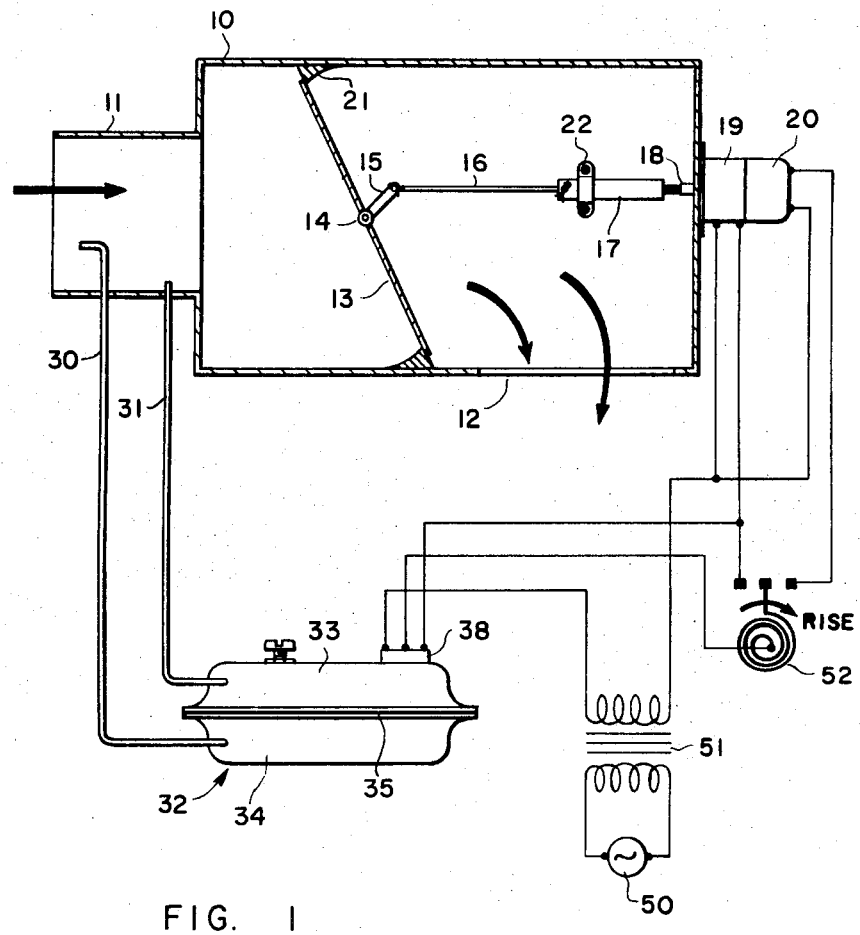
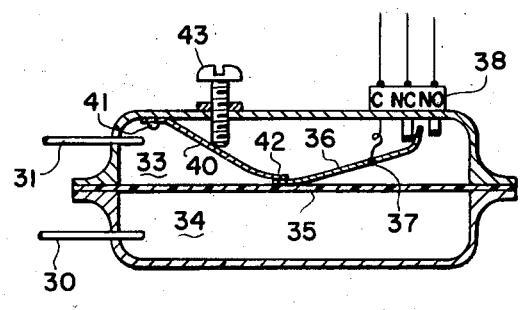
FIG. 1
FIG. 2
INVENTOR.
JOHN C. MC NABNEY

AIR DISTRIBUTION SYSTEM WITH FLOW LIMITING DEVICE

BACKGROUND OF THE INVENTION

This invention relates to conditioned air distribution systems of the type wherein air which has been conditioned at a central source is distributed to a plurality of zones. These systems are generally one of two types. One type furnishes air in constant volume, the temperature of which is varied in accordance with the demand from the conditioned space. In a second type, the temperature of the air remains constant, and the volume delivered to the zone is varied in accordance with zone demands.

The variable air volume system offers many advantages which flow from requiring only one source of conditioned air at constant temperature. Ducting can be kept relatively simple, and control valves generally do not have to be duplicated as is often the case in a dual-duct, dual-air source system. The variable air volume system lends itself particularly well to a structure with a constant requirement for either heating or cooling, for example, the interior portions of an office building wherein the heat provided by lighting and occupants is sufficient and a continuing requirement for additional cool air exists.

Such systems are not without problems, however, particularly in the area of control. It has been found, for example, that air distributing units have an optimum operating range for purposes of efficiency and noise level. Accordingly, a zone which calls for an excessive amount of conditioned air may cause a sufficiently high volume of air flow to create objectionable noise. Moreover, an excessive demand for conditioned air in one or more zones may create an inbalance in the overall system resulting in an air deficiency in other zones.

Various devices have been suggested for regulating air flow in variable air volume systems, but these devices have been characterized by the requirement for a source of regulatory pressure external to the system pressure itself, and/or requiring a substantial pressure drop in the range of 0.5 to 1.0 inches of water for effective operation.

SUMMARY OF THE INVENTION

It is an object of the present invention therefor to provide a flow limiting device for variable air volume systems which is operable on system pressure.

It is a further object to provide such a flow limiting device which does not require the inducement of an artificial pressure drop in the air delivery system.

A still further object is to provide a device and method wherein air flow volume normally controlled thermostatically can also be controlled in response to system velocity pressure.

Further objects and advantages of the present invention will become apparent as the specification proceeds.

The present invention has particular applicability to air distribution systems wherein air is delivered at substantially constant temperature in varying amounts to a plurality of zones. The desired temperature in each such zone may be adjusted by varying the volume of conditioned air admitted to the zone, which volume may be controlled by a thermostat. The volume of conditioned air admitted into the zone may be regulated by a single damper in the outlet box for that zone. When the thermostatic control indicates that additional conditioned air is required, the damper is driven further open. This action may continue in response to the thermostatic signal until the damper is sufficiently open that the air flow exceeds the design limitations. Should this occur, a pressure responsive means acting upon a measured differential pressure overrides the thermostatic control and drives the damper toward a closed position. When the damper has been sufficiently closed to bring the air flow wherein design parameters, the pressure responsive means is taken out of the control circuit and air flow control switched back to the temperature responsive thermostat.

DESCRIPTION OF PREFERRED EMBODIMENTS

Figure 3:
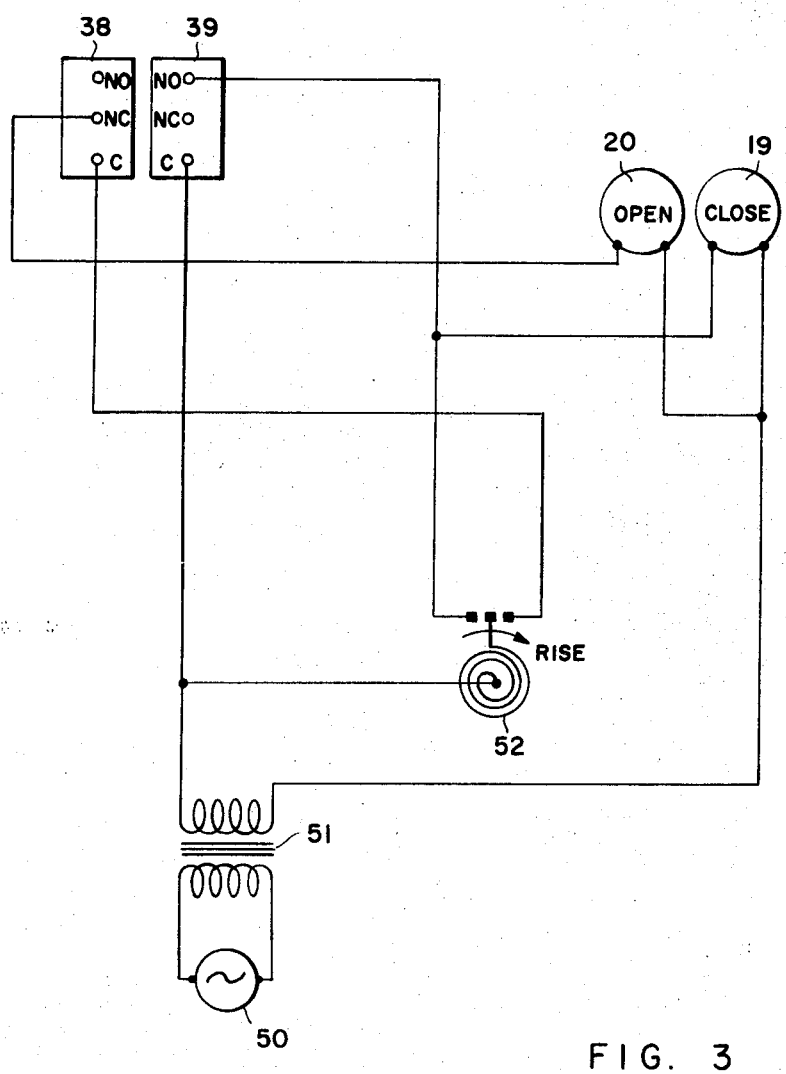

Embodiments of the present apparatus and method will be described in greater detail with reference to the attached drawings in which:

FIG. 1 is a schematic view of air terminal unit and is related control circuitry illustrating one embodiment of the invention, FIG. 2 is an enlarged, cutaway, partially schematic view of a pressure responsive switch useful in the present invention, and, FIG. 3 is a control circuit diagram illustrating another embodiment of the circuit shown in FIG. 1.

Referring to the drawings, and particularly to FIGS. 1 and 2, a terminal or outlet box is shown generally at 10, having an air inlet portion 11 and an air outlet portion 12. Inlet 11 communicates with a source of air, indicated by the arrow therein, and outlet 12 communicates with a zone to receive conditioned air from terminal box 10 through outlet portion 12. The conditioned air passing through the terminal box 10 is preferably of substantially constant temperature, which temperature may be cooler or warmer than the unconditioned temperature within the zone. While it will be understood that the principles of the present apparatus and method are equally applicable to the supply of cooled air or heated air to the space to be conditioned, for purposes of illustration it will be hereafter presumed that conditioned air refers to air which is cooler than the unconditioned air in the zone, and therefore, certain actions which take place upon temperature rise, for example, will be understood to be predicated on the assumption of a cool air supply. If it is desired to apply the principles of the present invention in a system wherein heated air is supplied, the same action would take place in response to a temperature fall, to use the same example.

Mounted within terminal box 10 is a single damper 13 which is adapted to rotate about rod 14 passing between the side walls of terminal box 10. The rotation of the damper 13 may be effected through lever arm 15 attached to damper 13 and rod 16. Rod 16 may be connected to common shaft 18 of damper closing motor 19 and damper opening motor 20 through a threaded coupling 17 held in bracket 22. In this manner, the rotation of the shaft 18 produces sliding linear motion of coupling 17 and shaft 16, which in turn produces rotational motion of lever arm 15 and damper 13.

If desired, damper stops 21 may be provided along the top and bottom walls of terminal box 10 to allow the damper 13 to come to a securely closed position within the terminal box. The face of damper stops 21 may be sloped at an appropriate angle to cooperate with damper 13 so that damper 13 may lie flat against stops 21 in the closed position.

Disposed within inlet portion 11 of terminal box 10 are sensing probes 30 and 31 which are oriented for maximum effectiveness. Probe 30 is arranged facing directly upstream of the air flow and probe 31 is arranged within the air stream and perpendicular to the direction of flow. The probes 30 and 31 have tubular passageways whereby the pressures sensed by each within the air stream are communicated to a pressure responsive means 32. The pressure responsive means 32 comprises an upper chamber 33 and a lower chamber 34 separated by a diaphram 35. The flow from probe 30 is fed into lower chamber 34, while the flow from probe 31 is fed into upper chamber 33. It has been found that probe 30 oriented upstream of the flow will measure a pressure equivalent of velocity pressure plus static pressure in the inlet 11, whereas probe 31 oriented perpendicular to the flow will indicate a pressure equivalent to static pressure less velocity pressure. It can be seen that the differential pressure across diaphram 35 will then be equal to twice the velocity pressure at inlet 11. Moreover, the probes measure system pressures directly, and require no artificial pressure drop for their operation.

The lower portion of arm 36 is in contact with diaphram 35, while the upper portion may be in contact with either the normally closed contact (NC) or the normally open contact (NO) of snapaction switch 38. Spring member 40 is fastened in position in upper chamber 33 by fastener 41. The lower foot 42 of spring member 40 rides on arm 36 so that spring member 40 is biased against upward movement of arm 36. The resistive force supplied by spring member 40 can be adjusted through set screw 43, allowing the device to be preset to operate at a predetermined maximum flow.

Power to operate damper motors 19 and 20 is provided by power source 50, which may be building line voltage, the voltage being stepped down by transformer 51. Completing the control circuit is thermostat 52, the operation of which will be explained in more detail hereinafter.

A somewhat modified version of the present invention is shown in FIG. 3. In that embodiment, the terminal box, damper, and sensing probes remain substantially similar to those shown in FIGS. 1 and 2. The pressure responsive means is of similar construction except that an additional snap action switch 39 is added, the function of which will be explained in detail as the specification proceeds.

OPERATION

Under normal conditions, it is desirable to operate the present system in response to the temperature in the conditioned zone. In operation, air is conditioned at a central source and distributed through a duct network to terminal boxes, such as terminal box 10, from which it flows into the zone to be conditioned. The air supplied is at substantially constant temperature, and the temperature of the zone is then adjusted by adjusting the volume of conditioned air delivered to that zone.

In order to accomplish the desired control, one side of transformer 51 is connected to the common terminal C of snap action switch 38, while the other side of the transformer is connected to closing motor 19 and opening motor 20.

Arm 36 of pressure responsive means 32 is in contact with NC contact of switch 38. Contact NC is connected to the bimetal element of thermostat 52. The low side, or falling temperature side of the thermostat 52 is connected to damper closing motor 19, and the high side, or temperature rising side of the thermostat 52 is connected to the damper opening motor 20.

With this circuitry, it can be seen that damper motors 19 and 20 are directly controlled by thermostat 52. As the temperature in the zone falls, the bimetal contact of the thermostat closes the circuit to the damper closing motor 19, driving the damper toward a closed position and reducing the cool air being supplied to the zone. As the temperature in the zone rises, the bimetal contact of the thermostat moves to the right, opening the circuit to the damper closing motor 19 and closing the circuit to the damper opening motor 20. This action reverses the rotation of shaft 18 and moves the damper toward an open position, thereby admitting a greater quantity of cooled air to terminal box 10 and to the conditioned zone through outlet 12. The damper motors 19 and 20 are preferably of the type having a very slow rate of rotation so that a time on the order of several minutes is required to move the damper from the open position to the closed position.

If the zone is very warm or subjected to an unusually high heat load, the bimetal contact of thermostat 52 may remain in contact with the high side of the circuit, keeping the damper opening motor 20 in operation for a sufficiently long period to cause the damper 13 to become opened too widely. When this occurs, an excessive volume of air may be allowed to flow through inlet portion 11 to terminal box 10.

Such a condition will be sensed by probes 30 and 31 and transmitted to pressure responsive device 32. As the velocity of the air in inlet 11 increases, the pressure in lower chamber 34 increases and the pressure in upper chamber 33 decreases proportionately. The pressure differential causes diaphram 35 to be displaced upwardly, rotating arm 36 about pin 37. When the differential pressure across diaphram 35 is sufficient to overcome the bias of spring member 40 as set by set screw 43, arm 36 is rotated sufficiently to break contact with contact NC and to go into contact with contact NO.

Removing contact NC from the circuit immediately removes thermostat 52 from the circuit to the damper motors. At the same time, contact NO is energized, providing power directly to the damper closing motor 19 and driving damper 13 toward a closed position. This action will continue until damper 13 is sufficiently closed to reduce the airflow through inlet 11 to a point whereby diaphram 35 recedes toward its neutral position due to a decrease in differential pressure as sensed by probes 30 and 31. Arm 36 rotates counterclockwise about pin 37, breaking contact with terminal NO and bringing arm 36 into contact with terminal NC. This, of course, discontinues power to the damper closing motor 19 and brings thermostat 52 back into the circuit.

As has been mentioned previously, the flow limiting device and circuit will generally come into play when a zone encounters a higher than normal heat load requiring an abnormal demand for cooling. It is generally during such periods that the flow limiting circuit will be necessary to override the thermostatic circuit in order to maintain air flow within desired limits. As has been pointed out, when the flow limiting circuit is energized, it immediately supplies power to the damper closing motor 19, even though the thermostat is calling for cooling. The flow limiting circuit remains energized until the flow velocity through inlet 11 has been reduced within design operating limits, at which time arm 36 shifts contact from NO terminal to NC terminal of switch 38, de-energizing the flow limiting circuit and re-energizing the thermostatic circuit. In some cases, a relatively high heat load may still exist in the zone, so that the thermostat will immediately call for cooling upon being re-energized. Accordingly, power will immediately be supplied to the damper opening motor 20 and the damper 13 will be moved toward a more open position. Should this continue for an extended period of time, the air flow may once again exceed the desired limitations.

Thus it can be seen that it is possible under certain conditions for the system to constantly cycle between the thermostatic control circuitry and the pressure sensing override circuit, with the damper motors being cycled on and off. Although this situation would eventually correct itself as the temperature in the zone was reduced, it can be prevented or greatly alleviated in the embodiment of the present invention shown in FIG. 3.

In that embodiment, the basic air distributing apparatus remains the same as that shown in FIGS. 1 and 2 and the control circuit is modified as shown in FIG. 3.

In this configuration, an additional snap-action switch 39 is included. The common terminal of snap-action switch 38 is connected to the high side terminal of thermostat 52. The normally closed terminal NC connects to one side of the damper opening motor 20. The common terminal of snap-action switch 39 is connected to the power supply transformer and the bi-metal element of thermostat 52. The normally open terminal NO of switch 39 is connected to one side of damper closing motor 19 and to the low side contact of thermostat 52.

In this embodiment, as the temperature in the zone rises, the bi-metal contact of the thermostat 52 moves to the right and contacts the high side terminal. This energizes the circuit to the damper opening motor 20 by way of common terminal C and terminal NC of switch 38. In this manner, the damper 13 is driven to a more open position in order to admit greater quantities of cool air.

When the air flow in the duct 11 exceeds the preset maximum, the arm 36 will rotate out of contact with terminal NC under action of diaphram 35, and into contact with terminal NO. This opens the circuit to damper opening motor 20 and terminates the opening movement of the damper, allowing the damper to remain at its preset maximum opening.

In the event, however, that the air flow through duct 11 continues to rise, such as may result from an excessive number of units in the overall system of having been shutdown, arm 36 will continue to rotate out of contact with terminal NC of switch 39 and into contact with terminal NO of switch 39. This then supplies power directly to damper closing motor 19, energizing that motor and driving the damper toward a closed position. This action continues until such time as the air flow through the duct is reduced to a predetermined acceptable level. At that time, arm 36 moves out of contact with terminal NO of switch 39 opening the circuit, thereby stopping the damper. The damper opening motor 20 remains out of the circuit without a further drop in flow, however, the damper closing motor 19 is now connected to the low side terminal of thermostat 52 so that in the event that the temperature in the zone falls damper closing motor 19 will be energized directly driving the damper towards a more closed position.

With a further drop in airflow through duct 11, arm 36 travels from normally closed terminal NC of switch 39 to terminal NC of switch 38. This action returns the high side terminal of thermostat 52 to the circuit as well as the low side terminal of thermostat. Either the damper opening motor 20 or the damper closing motor 19 can now operate in direct response to a rise or fall in temperature respectively.

It is preferred to preset the operating points of switches 38 and 39 to complement one and other and to provide a range of air flow within which the switches operate. For example, in a system which is designed to operate using air flow rates in the order of approximately 300 cubic feet per minute, switch 38 might be set to cut into the circuit at 300 CFM and to cut out at 270 CFM, whereas switch 39 would cut in at 330 CFM and cut out at 300 CFM. These figures are, of course, intended to be by way of example an illustration only in no means intended to be a limitation on the invention. It can be seen, however, that through the addition of switch 39 and the composition of the circuit as described, the possibility of the "hunting" situation which may arise in the embodiment shown in FIG. 1 is effectively eliminated.

Thus it can be seen that the present invention provides for an air flow control system wherein a single damper can control not only the air delivery requirements but the control requirements as well. Moreover in the present system no artificially induced pressure drop is required in its operation, and the system is relatively simple and economical to manufacturer and operate.

While in the foregoing specification the invention has been described in considerable detail, it will be under-stood that such detail is for the purpose of illustration and description, and not for the purpose of limitation of the invention which is defined in the intended claims. It will be understood that modifications and variations in the invention can be made by those skilled in the art without departing from the spirit or scope of the invention.

I claim:

1. In an air distribution system wherein air at a substantially constant temperature is delivered to a plurality of zones, the volume of said air delivered to each of said zones being normally varied according to the temperature of said zone, the improvement comprising means for sensing the velocity pressure and the static pressure of the air stream near said zone and transmitting said pressures to a pressure responsive means communicating with said sensing means, electrically operated switch means actuatable by said pressure responsive means to control the volume of air delivered to said zone regardless of zone temperature when the air flow rate as indicated by the relationship between said velocity pressure and said static pressure reaches a predetermined maximum.

2. In an air distribution system for delivering air at substantially constant temperature to a plurality of zones, the improvement including an air terminal unit for delivering air to one of said zones, said unit having movable damper means for varying the volume of air delivered to said zone, temperature responsive means to provide a signal to vary the position of said damper means in response to the temperature of said zone, sensing means in said unit to sense variations in the rate of air flow into said unit, said sensing means communicating with pressure responsive means movable in response to changes in said rate of air flow indicated by said sensing means, electrically operated switch means actuated in response to the movement of said pressure responsive means to override said temperature responsive means when said rate of air flow exceeds a predetermined maximum rate.

3. The apparatus of claim 2 including at least one electric motor for moving said damper means.

4. The apparatus of claim 3 including a pair of electric motors, one of said motors adapted to move said damper means in a first direction and the other of said motors adapted to move said damper means in the direction opposite said first direction.

5. The apparatus according to claim 2 wherein said temperature responsive means is a bimetal thermostat.

6. The apparatus according to claim 2 wherein said sensing means comprises a pair of probes, one of said probes facing directly upstream of the air flow, and the other of said probes extending into the air stream and facing perpendicular to the direction of air flow.

7. The apparatus of claim 2 wherein said pressure responsive means includes an upper and lower chamber, said chambers being separated by a movable diaphram, lever means communicating with said diaphram movable in response to the movement of said diaphram, said lever means communicating with the terminals of said electrically operated switch means.

8. The apparatus of claim 7 including a spring member riding on said lever means to oppose upward movement of said lever means.

9. The apparatus of claim 7 wherein said diaphram and said lever means are movable upwardly in response to increasing air flow into said air terminal unit.

10. The apparatus according to claim 2 wherein said electrically operated switch is a snap-action switch.

11. In an air distribution system for delivering air at substantially constant temperature to a plurality of zones, the improvement comprising an air terminal unit for delivering air to one of said zones, said unit having movable damper means for varying the volume of air delivered to said zone, motor means operatively connected to said damper means to move said damper, temperature responsive means communicating with said motor means to provide a signal to said motor means to move said damper means in response to the temperature in said zone, sensing means in said unit to sense variations in the rate of air flow into said unit, said sensing means communicating with pressure responsive means movable in response to changes in said rate of air flow indicated by said sensing means, first switch means actuated by said pressure responsive means in response to an increase in air flow to discontinue movement of said damper means.

12. The apparatus according to claim 11 further comprising second switch means actuated by said pressure responsive means in response to a further increase in air flow to move said damper means toward a closed position.

* * * * *